United States Patent
Kutthumolu et al.

(10) Patent No.: US 12,287,900 B2
(45) Date of Patent: Apr. 29, 2025

(54) SYSTEM AND METHOD FOR SECURE DATABASE MANAGEMENT

(71) Applicant: Bank of America Corporation, Charlotte, NC (US)

(72) Inventors: Durga Prasad Kutthumolu, Hyderabad (IN); Venkata Karthik Ryali, Hyderabad (IN); Priyanka K, Chennai (IN); Veerendra Gupta, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 52 days.

(21) Appl. No.: 18/448,865

(22) Filed: Aug. 11, 2023

(65) Prior Publication Data

US 2025/0053678 A1    Feb. 13, 2025

(51) Int. Cl.
G06F 21/62    (2013.01)
H04L 9/08    (2006.01)

(52) U.S. Cl.
CPC .......... *G06F 21/6227* (2013.01); *H04L 9/088* (2013.01)

(58) Field of Classification Search
CPC .............................. G06F 21/6227; H04L 9/088
See application file for complete search history.

(56) References Cited

U.S. PATENT DOCUMENTS

| | | | |
|---|---|---|---|
| 8,539,241 B2 | 9/2013 | Fielder | |
| 8,812,877 B2 | 8/2014 | Mori et al. | |
| 8,837,734 B2 | 9/2014 | McCallum et al. | |
| 9,087,212 B2 | 7/2015 | Balakrishnan et al. | |
| 9,118,631 B1 * | 8/2015 | Yung | H04L 9/3247 |
| 9,137,304 B2 | 9/2015 | Novotny et al. | |
| 9,213,764 B2 | 12/2015 | Kerschbaum et al. | |
| 9,747,456 B2 * | 8/2017 | Arasu | G06F 21/6245 |

(Continued)

FOREIGN PATENT DOCUMENTS

EP    2778951 B1    4/2017

OTHER PUBLICATIONS

Goldreich, Oded. "Secure multi-party computation." Foundations of computer science, 1986. FOCS'86.27th Annual Symposium on. IEEE, 1986. https://www.wisdom.weizmann.ac.il/~oded/PSX/prot.pdf.

(Continued)

*Primary Examiner* — Han Yang (57) ABSTRACT

A method includes encrypting a request received from a user device to generate an encrypted request. Encrypted data items are searched based on the encrypted request to identify desired encrypted data items. In response to determining that two or more encrypted data items of the desired encrypted data items have a same interaction identification, the two or more encrypted data items are locked and masked, and the masked two or more encrypted data items are removed. Algebraic operations are determined based on the encrypted request. An encrypted response is determined by performing the algebraic operations on the desired encrypted data items. The encrypted response is decrypted to obtain a decrypted response. An error is determined due to the algebraic operations performed on the desired encrypted data items. In response to determining that the error is less than an error threshold, the decrypted response is sent to the user device.

20 Claims, 3 Drawing Sheets

(56) References Cited

U.S. PATENT DOCUMENTS

| | | |
|---|---|---|
| 10,027,486 B2 | 7/2018 | Liu |
| 10,089,487 B2 | 10/2018 | Cash et al. |
| 10,333,696 B2 | 6/2019 | Ahmed |
| 10,719,567 B2 | 7/2020 | Antonopoulos et al. |
| 10,735,193 B1 | 8/2020 | Knas et al. |
| 2016/0344707 A1 | 11/2016 | Philipp |
| 2018/0027006 A1 | 1/2018 | Zimmermann et al. |
| 2024/0152629 A1* | 5/2024 | Deshpande ............ G06N 10/40 |
| 2024/0378596 A1* | 11/2024 | Singh ................ G06Q 20/4016 |

OTHER PUBLICATIONS

ISO 9241-11:2018. "Ergonomics of human-system interaction—Part 11: Guidance on usability." https://www.iso.org/obp/ui/#iso:std:iso:9241:-11:ed-2:v1:en.

"Oracle Database Advanced Security Administrator's Guide" (https://docs.oracle.com/en/database/oracle/oracle-database/19/asoag/).

"SQL Server Integration Services (SSIS)" (https://learn.microsoft.com/en-us/sql/integration-services/sql-server-integration-services?view=sql-server-ver16).

"MySQL :: MySQL 5.7 Reference Manual :: 22.1 Introduction to the MySQL Plug-In API" (https://dev.mysql.com/doc/refman/5.7/en).

https://infostore.saiglobal.com/preview/is/en/2018/i.s.eniso9241-11-2018.pdf?sku=1980667.

https://www.sis.se/api/document/preview/80003410/.

* cited by examiner

SYSTEM AND METHOD FOR SECURE DATABASE MANAGEMENT

TECHNICAL FIELD

The present disclosure relates generally to database management, and more specifically to a system and method for secure database management.

BACKGROUND

The growing amount of sensitive data stored in databases poses a serious security risk. Current database management systems do not provide adequate protection for sensitive data, which can result in data breaches and sensitive information loss.

SUMMARY

The system described in the present disclosure provides several practical applications and technical advantages that overcome the current technical problems with database management.

In general, a system for secure database management comprises a database management system operably coupled to a user device of a user and a data storage system via a network. The database management system receives a request from the user device of the user, generates a secret key and a public key, and encrypts the request using the public key to generate an encrypted request. The database management system searches a plurality of encrypted data items stored in the data storage system based on the encrypted request to identify a plurality of desired encrypted data items. In response to determining that two or more encrypted data items of the plurality of desired data items have a same interaction identification, the database management system locks and masks the two or more encrypted data items of the plurality of desired data items. The database management system removes the masked two or more encrypted data items from the plurality of desired encrypted data items. In response to determining that all encrypted data items having a same interaction identification are not identified, identifying, locking, masking, and removing operations are repeated one or more times until all encrypted data items having a same interaction identification are identified.

In response to determining that the two or more encrypted data items of the plurality of desired data items do not have the same interaction identification or in response to determining that all encrypted data items having a same interaction identification are identified, the database management system retrieves the plurality of desired encrypted data items from the data storage system The database management system determines one or more algebraic operations based on the encrypted request and determines an encrypted response based on the encrypted request and the plurality of desired encrypted data items by performing the one or more algebraic operations on the plurality of desired encrypted data items. The database management system decrypts the encrypted response using the secret key to obtain a decrypted response and determines an error due to the one or more algebraic operations performed on the plurality of desired encrypted data items.

In response to determining that the error is less than an error threshold, the database management system sends the decrypted response to the user device of the user. In response to determining that the error is not less than the error threshold, the database management system performs an error correction process on the decrypted response to obtain a corrected decrypted response. The error correction process may be repeated one or more times until the error becomes less than the error threshold. The database management system sends the corrected decrypted response to the user device of the user.

The system for secure database management allows for various advantages. By encrypting the request and performing the one or more algebraic operations on the plurality of desired encrypted data items to obtain the encrypted response, an unauthorized or malicious user is prevented from accessing interactions between the user device and the data storage system. In certain embodiments, the unauthorized or malicious user may alter data items stored in the data storage system, such that two or more data items may have a same interaction identification. By locking and masking the two or more data items and excluding the masked two or more data items from the plurality of desired encrypted data items, the encrypted response is not contaminated by the altered data items. Accordingly, the databased management system allows for improving security of interactions between the user device and the data storage system, which in turn allows for improving security of network communications between various computing systems.

Accordingly, the following disclosure is particularly integrated into practical applications of: (1) improving security of interactions between the user device and the data storage system; and (2) improving security of network communications between computing systems.

In one embodiment, a database management system communicatively coupled to a data storage system and a user device of a user includes a memory configured to store an error threshold and a processor communicatively coupled to the memory. The processor is configured to receive a request from the user device, encrypt the request to generate an encrypted request, and search a plurality of encrypted data items stored in the data storage system based on the encrypted request to identify a plurality of desired encrypted data items. In response to determining that two or more encrypted data items of the plurality of desired encrypted data items have a same interaction identification, the processor is further configured to lock the two or more encrypted data items, mask the two or more encrypted data items, and remove the masked two or more encrypted data items from the plurality of desired encrypted data items. The processor is further configured to retrieve the plurality of desired encrypted data items from the data storage system, determine one or more algebraic operations based on the encrypted request, determine an encrypted response based on the encrypted request and the plurality of desired encrypted data items by performing the one or more algebraic operations on the plurality of desired encrypted data items, decrypt the encrypted response to obtain a decrypted response, and determine an error for the decrypted response due to the one or more algebraic operations performed on the plurality of desired encrypted data items. In response to determining that the error is less than the error threshold, the processor is further configured to send the decrypted response to the user device.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Figure 1:
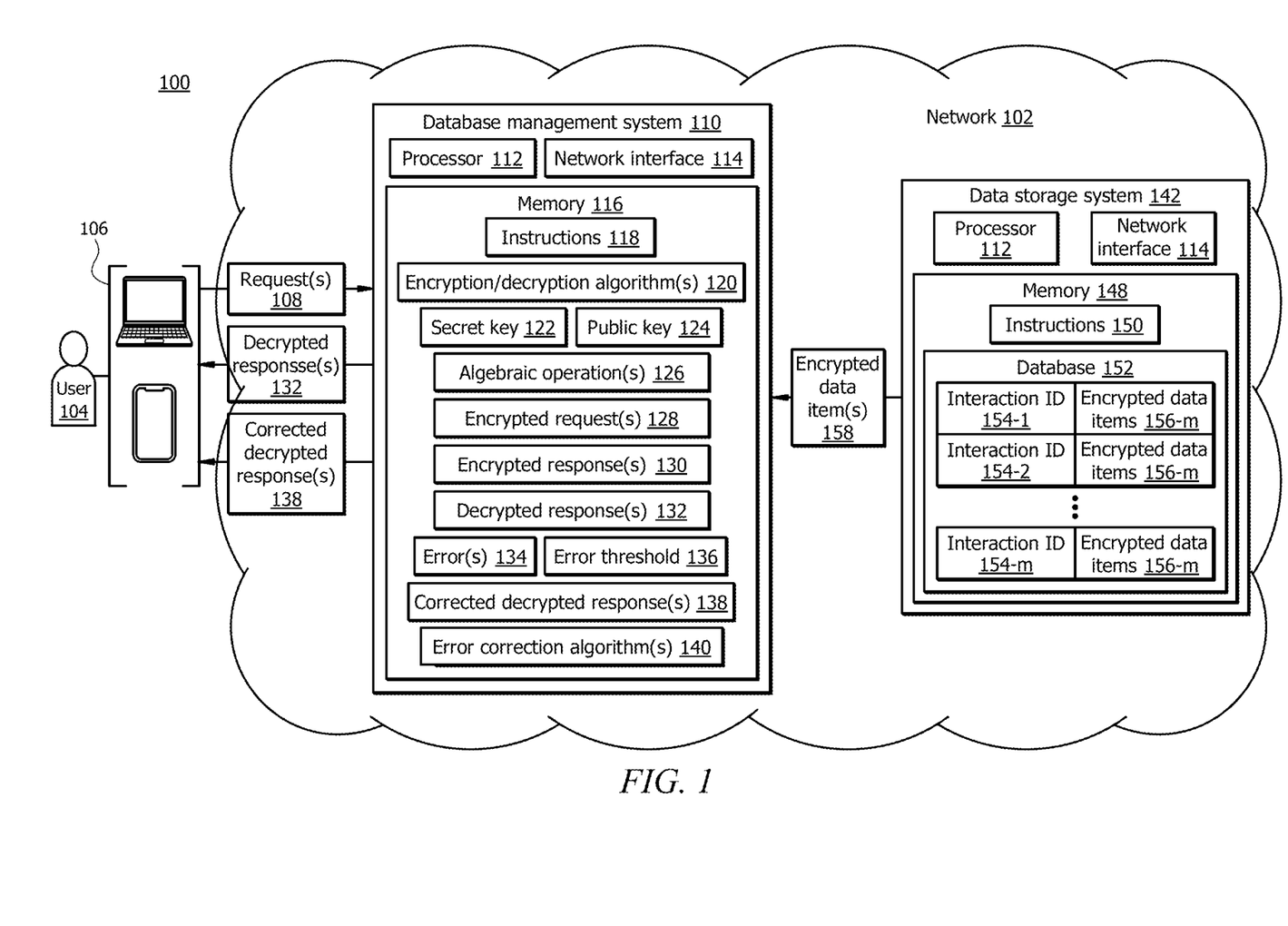
FIG. 1 illustrates an embodiment of a system for secure database management.
Figure 2A:
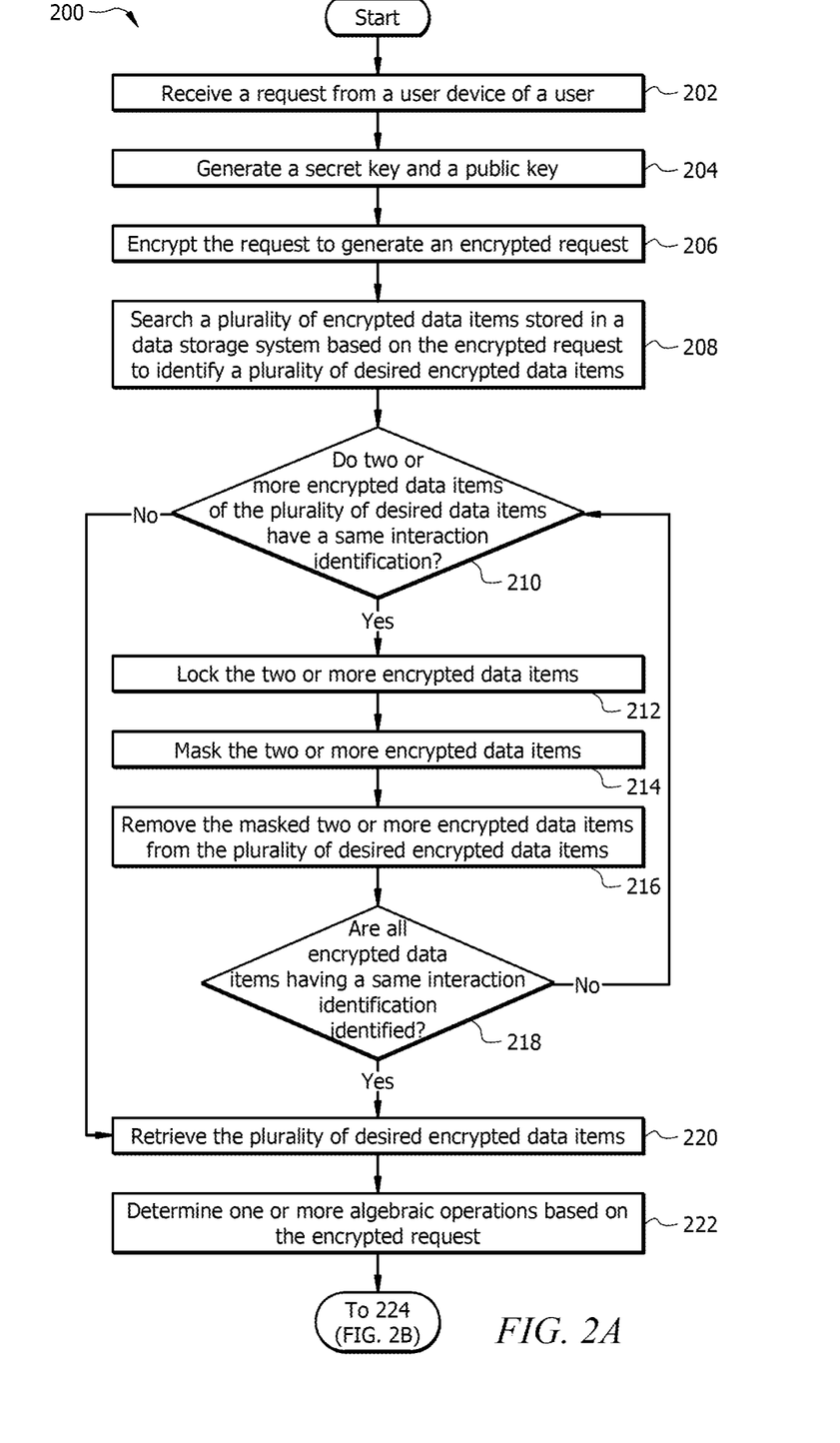
FIGS. 2A and 2B illustrate an example operational flow of system of FIG. 1 for secure database management.
Figure 2B:
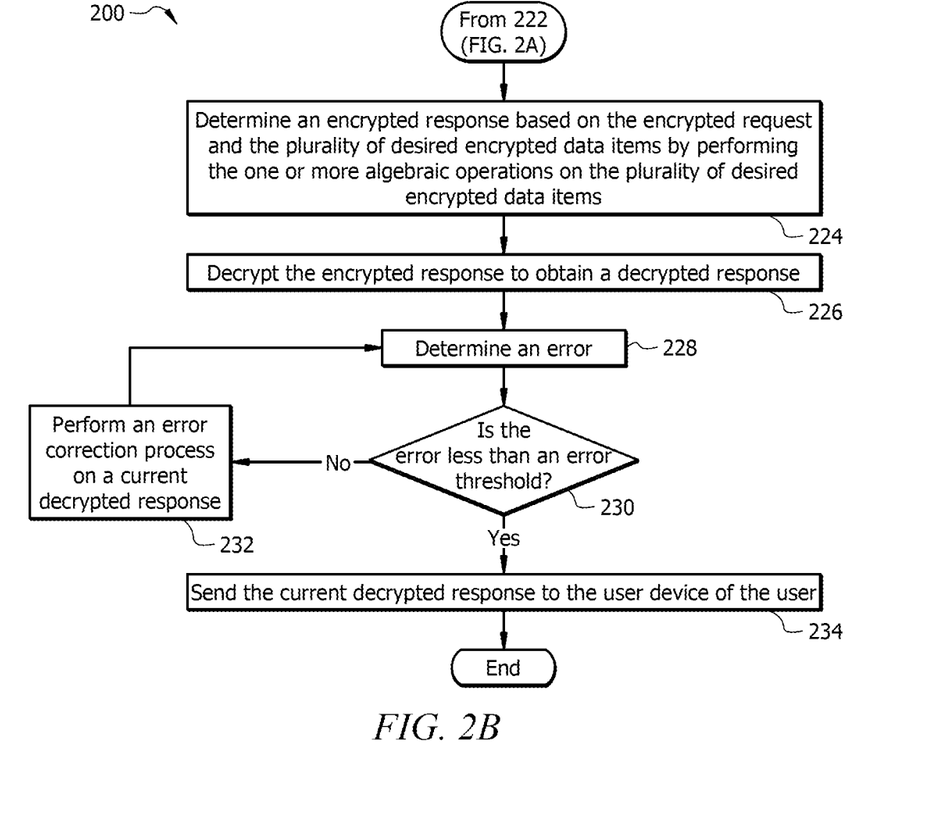

As described above, previous technologies fail to provide effective systems and methods for database management. Embodiments of the present disclosure and their advantages may be understood by referring to FIGS. 1, 2A and 2B. FIGS. 1, 2A and 2B are used to describe a system and method for secure database management.

System Overview

FIG. 1 illustrates an embodiment of a system 100 for secure database management. In certain embodiments, the system 100 comprises a database management system 110 operably coupled to a user device 106 of a user 104 and a data storage system 142 via a network 102. Network 102 enables the communication between the components of the system 100. In other embodiments, the system 100 may not have all the components listed and/or may have other elements instead of, or in addition to, those listed above. For example, the database management system 110 may be integrated into the data storage system 142.

In general, the database management system 110 receives a request 108 from the user device 106 of the user 104, generates a secret key 122 and a public key 124, and encrypts the request 108 using the public key 124 to generate an encrypted request 128. The database management system 110 searches a plurality of encrypted data items 156-1 through 156-$m$ stored in the data storage system 142 based on the encrypted request 128 to identify a plurality of desired encrypted data items 158.

In response to determining that two or more encrypted data items (e.g., respective ones of the plurality of encrypted data items 156-1 through 156-$m$ of FIG. 1) of the plurality of desired encrypted data items 158 have a same interaction identification (e.g., respective one of the plurality of interaction identifications 154-1 through 154-$m$ of FIG. 1), the database management system 110 locks and masks the two or more encrypted data items of the plurality of desired encrypted data items 158. The database management system 110 removes the masked two or more encrypted data items from the plurality of desired encrypted data items 158. In response to determining that all encrypted data items having a same interaction identification are not identified, identifying, locking, masking and removing operations are repeated one or more times until all encrypted data items having a same interaction identification are identified. In response to determining that the two or more encrypted data items of the plurality of desired encrypted data items 158 do not have the same interaction identification or in response to determining that all encrypted data items having a same interaction identification are identified, the database management system 110 retrieves the plurality of desired encrypted data items 158 from the data storage system 142.

The database management system 110 determines one or more algebraic operations 126 based on the encrypted request 128 and determines an encrypted response 130 based on the encrypted request 128 and the plurality of desired encrypted data items 158 by performing the one or more algebraic operations 126 on the plurality of desired encrypted data items 158. The database management system 110 decrypts the encrypted response 130 using the secret key 122 to obtain a decrypted response 132 and determines an error 134 due to the one or more algebraic operations 126 performed on the plurality of desired encrypted data items 158.

In response to determining that the error 134 is less than an error threshold 136, the database management system 110 sends the decrypted response 132 to the user device 106 of the user 104. In response to determining that the error 134 is not less than the error threshold 136, the database management system 110 performs an error correction process on the decrypted response 132 to obtain a corrected decrypted response 138. The error correction process may be repeated one or more times until the error 134 becomes less than the error threshold 136. The database management system 110 sends the corrected decrypted response 138 to the user device 106 of the user 104.

By encrypting the request 108 and performing the one or more algebraic operations 126 on the plurality of desired encrypted data items 158 to obtain the encrypted response 130, an unauthorized or malicious user is prevented from accessing interactions between the user device 106 and the data storage system 142. In certain embodiments, the unauthorized or malicious user may alter data items stored in the data storage system 142, such that two or more data items may have a same interaction identification. By locking and masking the two or more data items and excluding the masked two or more data items from the plurality of desired encrypted data items 158, the encrypted response 130 is not contaminated by the altered data items. Accordingly, the database management system 110 allows for improving security of interactions between the user device 106 and the data storage system 142.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

User Device

The user device 106 is generally any device that is configured to process data and interact with the user 104. Examples of the user device 106 include, but are not limited to, a personal computer, a desktop computer, a workstation, a server, a laptop, a tablet computer, a mobile phone (such as a smartphone), a virtual reality headset, etc. The user device 106 may include a user interface, such as a display, a microphone, keypad, or other appropriate terminal equipment usable by a respective user. The user device 106 may include a hardware processor, memory, and/or circuitry (not explicitly shown) configured to perform any of the functions or actions of the user device described herein. For example, software applications designed using software code may be stored in respective memories and executed by respective processors to perform the functions of the user device 106. The user device 106 is configured to communicate with other components of the system 100 via the network 102.

In operation, the user device 106 of the user 104 is configured send one or more requests 108 to the database management system 110 and receive one or more corrected responses from the database management system 110.

Database Management System

The database management system 110 is generally any device that is configured to process data and communicate with other components of the system 100 via the network 102. The database management system 110 may comprise a processor 112 in signal communication with a memory 116 and a network interface 114.

Processor 112 comprises one or more processors operably coupled to the memory 116. Processor 112 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 112 may be a programmable logic device, a microcontroller, a microprocessor, or any suitable combination of the preceding. The one or more processors are configured to process data and may be implemented in hardware or software. For example, processor 112 may be 8-bit, 16-bit, 32-bit, 64-bit, or of any other suitable architecture. The one or more processors are configured to implement various software instructions to perform the operations described herein. For example, the one or more processors are configured to execute software instructions 118, one or more encryption/decryption algorithms 120, one or more error correction algorithms 140, and perform one or more functions described herein.

Network interface 114 is configured to enable wired and/or wireless communications (e.g., via network 102). Network interface 114 is configured to communicate data between the database management system 110 and other components of the system 100. For example, the network interface 114 may comprise a WIFI interface, a local area network (LAN) interface, a wide area network (WAN) interface, a modem, a switch, or a router. The processor 112 is configured to send and receive data using the network interface 114. Network interface 114 may be configured to use any suitable type of communication protocol as would be appreciated by one of ordinary skill in the art.

The memory 116 comprises a non-transitory computer-readable medium such as one or more disks, tape drives, or solid-state drives, and may be used as an over-flow data storage device, to store programs when such programs are selected for execution, and to store instructions and data that are read during program execution. Memory 116 may be volatile or non-volatile and may comprise a read-only memory (ROM), random-access memory (RAM), ternary content-addressable memory (TCAM), dynamic random-access memory (DRAM), and static random-access memory (SRAM). Memory 116 may be implemented using one or more disks, tape drives, solid-state drives, and/or the like. The memory 116 may store any of the information described in FIGS. 1, 2A and 2B along with any other data, instructions, logic, rules, or code operable to implement the function(s) described herein. The memory 116 is operable to store software instructions 118, the one or more encryption/decryption algorithms 120, the one or more error correction algorithms 140, and/or any other data and instructions. The software instructions 118 and the one or more encryption/decryption algorithms 120 may comprise any suitable set of software instructions, logic, rules, or code operable to be executed by the processor 112. The one or more encryption/decryption algorithms 120 may comprise suitable homomorphic encryption algorithms.

In operation, the processor 112 of the database management system 110 receives a request 108 from the user device 106 of the user 104. The processor 112 of the database management system 110 generates a secret key 122 and a public key 124. In certain embodiments, the key generation process comprises executing one or more encryption/decryption algorithms 120 by the processor 112 of the database management system 110. The one or more encryption/decryption algorithms 120 may comprise suitable homomorphic encryption algorithms. The processor 112 of the database management system 110 encrypts the request 108 using the public key 124 to generate an encrypted request 128. In certain embodiments, the encryption process comprises executing one or more encryption/decryption algorithms 120 by the processor 112 of the database management system 110.

The processor 112 of the database management system 110 searches a plurality of encrypted data items 156-1 through 156-$m$ stored in the data storage system 142 based on the encrypted request 128 to identify a plurality of desired encrypted data items 158. In certain embodiments, the plurality of desired encrypted data items 158 may comprise one or more of the plurality of encrypted data items 156-1 through 156-$m$. In response to determining that two or more encrypted data items (e.g., respective ones of the plurality of encrypted data items 156-1 through 156-$m$ of FIG. 1) of the plurality of desired encrypted data items 158 have a same interaction identification (e.g., respective one of the plurality of interaction identifications 154-1 through 154-$m$ of FIG. 1), the processor 112 of the database management system 110 locks the two or more encrypted data items (e.g., respective ones of the plurality of encrypted data items 156-1 through 156-$m$ of FIG. 1) of the plurality of desired encrypted data items 158. In certain embodiments, the locking process comprises preventing updates to the two or more encrypted data items (e.g., respective ones of the plurality of encrypted data items 156-1 through 156-$m$ of FIG. 1). The processor 112 of the database management system 110 masks the two or more encrypted data items (e.g., respective ones of the plurality of encrypted data items 156-1 through 156-$m$ of FIG. 1) of the plurality of desired encrypted data items 158. The processor 112 of the database management system 110 removes the masked two or more encrypted data items (e.g., respective ones of the plurality of encrypted data items 156-1 through 156-$m$ of FIG. 1) from the plurality of desired encrypted data items 158.

In response to determining that all encrypted data items (e.g., respective ones of the plurality of encrypted data items 156-1 through 156-$m$ of FIG. 1) having a same interaction identification (e.g., respective one of the plurality of interaction identifications 154-1 through 154-$m$ of FIG. 1) are not identified, identifying, locking, masking and removing operations are repeated one or more times until all encrypted data items (e.g., respective ones of the plurality of encrypted data items 156-1 through 156-$m$ of FIG. 1) having a same interaction identification (e.g., respective one of the plurality of interaction identifications 154-1 through 154-$m$ of FIG. 1) are identified.

In response to determining that the two or more encrypted data items (e.g., respective ones of the plurality of encrypted data items 156-1 through 156-$m$ of FIG. 1) of the plurality of desired encrypted data items 158 do not have the same interaction identification (e.g., respective one of the plurality of interaction identifications 154-1 through 154-$m$ of FIG. 1) or in response to determining that all encrypted data items (e.g., respective ones of the plurality of encrypted data items 156-1 through 156-$m$ of FIG. 1) having a same interaction identification (e.g., respective one of the plurality of interaction identifications 154-1 through 154-$m$ of FIG. 1) are identified, the processor 112 of the database management system 110 retrieves the plurality of desired encrypted data items 158 from the data storage system 142.

The processor 112 of the database management system 110 determines one or more algebraic operations 126 based on the encrypted request 128. In certain embodiments, the one or more algebraic operations 126 comprise addition or multiplication. The processor 112 of the database management system 110 determines an encrypted response 130 based on the encrypted request 128 and the plurality of desired encrypted data items 158 by performing the one or more algebraic operations 126 on the plurality of desired encrypted data items 158. The processor 112 of the database management system 110 decrypts the encrypted response 130 using the secret key 122 to obtain a decrypted response 132. In certain embodiments, the decryption process comprises executing the one or more encryption/decryption algorithms 120 by the processor 112 of the database management system 110. The processor 112 of the database management system 110 determines an error 134 due to the one or more algebraic operations 126 performed on the plurality of desired encrypted data items 158.

In response to determining that the error 134 is less than an error threshold 136, the processor 112 of the database management system 110 sends the decrypted response 132 to the user device 106 of the user 104. In response to determining that the error 134 is not less than the error threshold 136, the processor 112 of the database management system 110 performs an error correction process on the decrypted response 132 to obtain a corrected decrypted response 138. In certain embodiments, the error correction process comprises executing one or more error correction algorithms 140 by the processor 112 of the database management system 110. The error correction process may be repeated one or more times until the error 134 becomes less than the error threshold 136. The processor 112 of the database management system 110 sends the corrected decrypted response 138 to the user device 106 of the user 104.

By encrypting the request 108 and performing the one or more algebraic operations 126 on the plurality of desired encrypted data items 158 to obtain the encrypted response 130, an unauthorized or malicious user is prevented from accessing interactions between the user device 106 and the data storage system 142. In certain embodiments, the unauthorized or malicious user may alter the encrypted data items 156-1 through 156-$m$ stored in the data storage system 142, such that two or more encrypted data items may have a same interaction identification (e.g., respective one of the plurality of interaction identifications 154-1 through 154-$m$ of FIG. 1). By locking and masking the two or more encrypted data items and excluding the masked two or more data items from the plurality of desired encrypted data items 158, the encrypted response 130 is not contaminated by the altered encrypted data items. Accordingly, the database management system 110 allows for improving security of interactions between the user device 106 and the data storage system 142.

Data Storage System

The data storage system 142 is generally any device that is configured to process data and communicate with other components of the system 100 via the network 102. The data storage system 142 may comprise a processor 144 in signal communication with a memory 148 and a network interface 146.

Processor 144 comprises one or more processors operably coupled to the memory 148. Processor 144 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 144 may be a programmable logic device, a microcontroller, a microprocessor, or any suitable combination of the preceding. The one or more processors are configured to process data and may be implemented in hardware or software. For example, processor 144 may be 8-bit, 16-bit, 32-bit, 64-bit, or of any other suitable architecture. The one or more processors are configured to implement various software instructions to perform the operations described herein. For example, the one or more processors are configured to execute software instructions 150 and perform one or more functions described herein.

Network interface 146 is configured to enable wired and/or wireless communications (e.g., via network 102). Network interface 146 is configured to communicate data between the data storage system 142 and other components of the system 100. For example, the network interface 146 may comprise a WIFI interface, a local area network (LAN) interface, a wide area network (WAN) interface, a modem, a switch, or a router. The processor 144 is configured to send and receive data using the network interface 146. Network interface 146 may be configured to use any suitable type of communication protocol as would be appreciated by one of ordinary skill in the art.

Memory 148 comprises a non-transitory computer-readable medium such as one or more disks, tape drives, or solid-state drives, and may be used as an over-flow data storage device, to store programs when such programs are selected for execution, and to store instructions and data that are read during program execution. Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. The memory 148 may store any of the information described in FIGS. 1, 2A and 2B along with any other data, instructions, logic, rules, or code operable to implement the function(s) described herein. The memory 148 is operable to store software instructions 150 and/or any other data and instructions. The software instructions 150 may comprise any suitable set of software instructions, logic, rules, or code operable to be executed by the processor 144.

The memory 148 is further operable to store a database 152. The database 152 may comprise encrypted data items 156-1 through 156-$m$ along with respective interaction identifications 154-1 through 154-$m$. The interaction identifications 154-1 through 154-$m$ may comprise one or more alphanumeric characters. In certain embodiments, the interaction identifications 154-1 through 154-$m$ comprise financial transaction identifications. In such embodiments, each of the encrypted data items 156-1 through 156-$m$ may comprise a customer name, an account number, a credit limit, a transaction amount, a total revolving balance, a credit card category, or the like.

Example Method for Secure Database Management

FIGS. 2A and 2B illustrate an example flowchart of a method 200 for secure database management. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., instructions 118, one or more encryption/decryption algorithms 120, and/or one or more error correction algorithms 140 of FIG. 1), stored on non-transitory, tangible, computer-readable medium (e.g., memories 116 and/or 148 of FIG. 1) that when executed by one or more processors (e.g., processors 112 and/or 144 of FIG. 1) may cause the one or more processors to perform operations 202-234.

Method 200 starts with operation 202, where a processor 112 of a database management system 110 receives a request 108 from a user device 106 of a user 104.

At operation 204, the processor 112 of the database management system 110 generates a secret key 122 and a public key 124. In certain embodiments, the key generation process comprises executing one or more encryption/decryption algorithms 120 by the processor 112 of the database management system 110. The one or more encryption/decryption algorithms 120 may comprise suitable homomorphic encryption algorithms.

At operation 206, the processor 112 of the database management system 110 encrypts the request 108 using the public key 124 to generate an encrypted request 128. In certain embodiments, the encryption process comprises executing one or more encryption/decryption algorithms 120 by the processor 112 of the database management system 110.

At operation 208, the processor 112 of the database management system 110 searches a plurality of encrypted data items 156-1 through 156-$m$ stored in a data storage system 142 based on the encrypted request 128 to identify a plurality of desired encrypted data items 158. In certain embodiments, the plurality of desired encrypted data items 158 may comprise one or more of the plurality of encrypted data items 156-1 through 156-$m$.

At operation 210, the processor 112 of the database management system 110 determines if two or more encrypted data items (e.g., respective ones of the plurality of encrypted data items 156-1 through 156-$m$ of FIG. 1) of the plurality of desired encrypted data items 158 have a same interaction identification (e.g., respective one of the plurality of interaction identifications 154-1 through 154-$m$ of FIG. 1).

In response to determining at operation 210 that the two or more encrypted data items (e.g., respective ones of the plurality of encrypted data items 156-1 through 156-$m$ of FIG. 1) of the plurality of desired encrypted data items 158 have the same interaction identification (e.g., respective one of the plurality of interaction identifications 154-1 through 154-$m$ of FIG. 1), method 200 continues to operation 212. At operation 212, the processor 112 of the database management system 110 locks the two or more encrypted data items (e.g., respective ones of the plurality of encrypted data items 156-1 through 156-$m$ of FIG. 1) of the plurality of desired encrypted data items 158. In certain embodiments, the locking process comprises preventing updates to the two or more encrypted data items (e.g., respective ones of the plurality of encrypted data items 156-1 through 156-$m$ of FIG. 1).

At operation 214, the processor 112 of the database management system 110 masks the two or more encrypted data items (e.g., respective ones of the plurality of encrypted data items 156-1 through 156-$m$ of FIG. 1) of the plurality of desired encrypted data items 158.

At operation 216, the processor 112 of the database management system 110 removes the masked two or more encrypted data items (e.g., respective ones of the plurality of encrypted data items 156-1 through 156-$m$ of FIG. 1) from the plurality of desired encrypted data items 158.

At operation 218, the processor 112 of the database management system 110 determines if all encrypted data items (e.g., respective ones of the plurality of encrypted data items 156-1 through 156-$m$ of FIG. 1) having a same interaction identification (e.g., respective one of the plurality of interaction identifications 154-1 through 154-$m$ of FIG. 1) are identified.

In response to determining at operation 218 that all encrypted data items (e.g., respective ones of the plurality of encrypted data items 156-1 through 156-$m$ of FIG. 1) having a same interaction identification (e.g., respective one of the plurality of interaction identifications 154-1 through 154-$m$ of FIG. 1) are not identified, method 200 goes back to operation 210. In certain embodiments, operations 210 through 218 are repeated one or more times until all encrypted data items (e.g., respective ones of the plurality of encrypted data items 156-1 through 156-$m$ of FIG. 1) having a same interaction identification (e.g., respective one of the plurality of interaction identifications 154-1 through 154-$m$ of FIG. 1) are identified.

In response to determining at operation 210 that the two or more encrypted data items (e.g., respective ones of the plurality of encrypted data items 156-1 through 156-$m$ of FIG. 1) of the plurality of desired encrypted data items 158 do not have the same interaction identification (e.g., respective one of the plurality of interaction identifications 154-1 through 154-$m$ of FIG. 1) or in response to determining at operation 218 that all encrypted data items (e.g., respective ones of the plurality of encrypted data items 156-1 through 156-$m$ of FIG. 1) having a same interaction identification (e.g., respective one of the plurality of interaction identifications 154-1 through 154-$m$ of FIG. 1) are identified, method 200 continues to operation 220.

At operation 220, the processor 112 of the database management system 110 retrieves the plurality of desired encrypted data items 158 from the data storage system 142.

At operation 222, the processor 112 of the database management system 110 determines one or more algebraic operations 126 based on the encrypted request 128. In certain embodiments, the one or more algebraic operations 126 comprise addition or multiplication.

At operation 224, the processor 112 of the database management system 110 determines an encrypted response 130 based on the encrypted request 128 and the plurality of desired encrypted data items 158 by performing the one or more algebraic operations 126 on the plurality of desired encrypted data items 158.

At operation 226, the processor 112 of the database management system 110 decrypts the encrypted response 130 using the secret key 122 to obtain a decrypted response 132. In certain embodiments, the decryption process comprises executing the one or more encryption/decryption algorithms 120 by the processor 112 of the database management system 110.

At operation 228, the processor 112 of the database management system 110 determines an error 134 due to the one or more algebraic operations 126 performed on the plurality of desired encrypted data items 158.

At operation 230, the processor 112 of the database management system 110 determines if the error 134 less than an error threshold 136.

In response to determining at operation 230 that the error 134 is not less than the error threshold 136, method 200 continues to operation 232. At operation 232, the processor 112 of the database management system 110 performs an error correction process on a current decrypted response (e.g., decrypted response 132) to obtain a corrected decrypted response 138. In certain embodiments, the error correction process comprises executing one or more error correction algorithms 140 by the processor 112 of the database management system 110. After performing operation 232, method 200 goes back to operation 228. In certain embodiments, operations 228 though 232 are preformed one or more times until the error 134 becomes less than the error threshold 136.

In response to determining at operation 230 that the error 134 is less than the error threshold 136, method 200 continues to operation 234. At operation 234, the processor 112 of the database management system 110 sends the current decrypted response (e.g., decrypted response 132 or corrected decrypted response 138 of FIG. 1) to the user device 106 of the user 104. After performing operation 234, method 200 ends.

By encrypting the request 108 and performing the one or more algebraic operations 126 on the plurality of desired encrypted data items 158 to obtain the encrypted response 130, an unauthorized or malicious user is prevented from accessing interactions between the user device 106 and the data storage system 142. In certain embodiments, the unauthorized or malicious user may alter the encrypted data items 156-1 through 156-$m$ stored in the data storage system 142, such that two or more encrypted data items may have a same interaction identification (e.g., respective one of the plurality of interaction identifications 154-1 through 154-$m$ of FIG. 1). By locking and masking the two or more encrypted data items and excluding the masked two or more data items from the plurality of desired encrypted data items 158, the encrypted response 130 is not contaminated by the altered encrypted data items. Accordingly, method 200 allows for improving security of interactions between the user device 106 and the data storage system 142.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A database management system communicatively coupled to a data storage system and a user device of a user, the system comprising:
   a memory configured to store an error threshold; and
   a processor communicatively coupled to the memory, wherein the processor is configured to:
      receive a request from the user device;
      encrypt the request to generate an encrypted request;
      search a plurality of encrypted data items stored in the data storage system based on the encrypted request to identify a plurality of desired encrypted data items;
      in response to determining that two or more encrypted data items of the plurality of desired encrypted data items have a same interaction identification:
      lock the two or more encrypted data items;
      mask the two or more encrypted data items; and
      remove the masked two or more encrypted data items from the plurality of desired encrypted data items;
      retrieve the plurality of desired encrypted data items from the data storage system;
      determine one or more algebraic operations based on the encrypted request;
      determine an encrypted response based on the encrypted request and the plurality of desired encrypted data items by performing the one or more algebraic operations on the plurality of desired encrypted data items;
      decrypt the encrypted response to obtain a decrypted response;
      determine an error for the decrypted response due to the one or more algebraic operations performed on the plurality of desired encrypted data items; and
      in response to determining that the error is less than the error threshold, send the decrypted response to the user device.

2. The database management system of claim 1, wherein the processor is further configured to, in response to determining that the error is not less than the error threshold:
   perform an error correction process on the decrypted response to obtain a corrected decrypted response;
   determine a second error for the corrected decrypted response; and
   in response to determining that the second error is less than the error threshold, send the corrected decrypted response to the user device.

3. The database management system of claim 1, wherein encrypting the request comprises executing a homomorphic encryption algorithm.

4. The database management system of claim 1, wherein the one or more algebraic operations comprise addition or multiplication.

5. The database management system of claim 1, wherein:
   the processor is further configured to generate a public key; and encrypting the request to generate the encrypted request comprises encrypting the request using the public key.

6. The database management system of claim 1, wherein:
the processor is further configured to generate a secret key; and
decrypting the encrypted response to obtain the decrypted response comprises decrypting the encrypted response using the secret key.

7. The database management system of claim 1, wherein locking the two or more encrypted data items comprises preventing updates to the two or more encrypted data items.

8. A method comprising:
receiving a request from a user device;
encrypting the request to generate an encrypted request;
searching a plurality of encrypted data items stored in a data storage system based on the encrypted request to identify a plurality of desired encrypted data items;
in response to determining that two or more encrypted data items of the plurality of desired encrypted data items have a same interaction identification:
locking the two or more encrypted data items;
masking the two or more encrypted data items; and
removing the masked two or more encrypted data items from the plurality of desired encrypted data items;
retrieving the plurality of desired encrypted data items from the data storage system;
determining one or more algebraic operations based on the encrypted request;
determining an encrypted response based on the encrypted request and the plurality of desired encrypted data items by performing the one or more algebraic operations on the plurality of desired encrypted data items;
decrypting the encrypted response to obtain a decrypted response;
determining an error for the decrypted response due to the one or more algebraic operations performed on the plurality of desired encrypted data items; and
in response to determining that the error is less than an error threshold, sending the decrypted response to the user device.

9. The method of claim 8, further comprising, in response to determining that the error is not less than the error threshold:
performing an error correction process on the decrypted response to obtain a corrected decrypted response;
determining a second error for the corrected decrypted response; and
in response to determining that the second error is less than the error threshold, sending the corrected decrypted response to the user device.

10. The method of claim 8, wherein encrypting the request comprises executing a homomorphic encryption algorithm.

11. The method of claim 8, wherein the one or more algebraic operations comprise addition or multiplication.

12. The method of claim 8, further comprising generating a public key, wherein encrypting the request to generate the encrypted request comprises encrypting the request using the public key.

13. The method of claim 8, further comprising generating a secret key, wherein decrypting the encrypted response to obtain the decrypted response comprises decrypting the encrypted response using the secret key.

14. The method of claim 8, wherein locking the two or more encrypted data items comprises preventing updates to the two or more encrypted data items.

15. A non-transitory computer-readable medium storing instructions that, when executed by one or more processors, cause the one or more processors to:
receive a request from a user device;
encrypt the request to generate an encrypted request;
search a plurality of encrypted data items stored in a data storage system based on the encrypted request to identify a plurality of desired encrypted data items;
in response to determining that two or more encrypted data items of the plurality of desired encrypted data items have a same interaction identification:
lock the two or more encrypted data items;
mask the two or more encrypted data items; and
remove the masked two or more encrypted data items from the plurality of desired encrypted data items;
retrieve the plurality of desired encrypted data items from the data storage system;
determine one or more algebraic operations based on the encrypted request;
determine an encrypted response based on the encrypted request and the plurality of desired encrypted data items by performing the one or more algebraic operations on the plurality of desired encrypted data items;
decrypt the encrypted response to obtain a decrypted response;
determine an error for the decrypted response due to the one or more algebraic operations performed on the plurality of desired encrypted data items; and
in response to determining that the error is less than an error threshold, send the decrypted response to the user device.

16. The non-transitory computer-readable medium of claim 15, wherein the instructions, when executed by the one or more processors, further cause the one or more processors to:
in response to determining that the error is not less than the error threshold:
perform an error correction process on the decrypted response to obtain a corrected decrypted response;
determine a second error for the corrected decrypted response; and
in response to determining that the second error is less than the error threshold, send the corrected decrypted response to the user device.

17. The non-transitory computer-readable medium of claim 15, wherein encrypting the request comprises executing a homomorphic encryption algorithm.

18. The non-transitory computer-readable medium of claim 15, wherein the one or more algebraic operations comprise addition or multiplication.

19. The non-transitory computer-readable medium of claim 15, wherein the instructions, when executed by the one or more processors, further cause the one or more processors to generate a public key, wherein encrypting the request to generate the encrypted request comprises encrypting the request using the public key.

20. The non-transitory computer-readable medium of claim 15, wherein the instructions, when executed by the one or more processors, further cause the one or more processors to generate a secret key, wherein decrypting the encrypted response to obtain the decrypted response comprises decrypting the encrypted response using the secret key.

* * * * *